(12) United States Patent
Badawy et al.

(10) Patent No.: US 11,966,858 B2
(45) Date of Patent: *Apr. 23, 2024

(54) SYSTEMS AND METHODS FOR DATA CORRELATION AND ARTIFACT MATCHING IN IDENTITY MANAGEMENT ARTIFICIAL INTELLIGENCE SYSTEMS

(71) Applicant: SailPoint Technologies, Inc., Austin, TX (US)

(72) Inventors: Mohamed M. Badawy, Round Rock, TX (US); Rajat Kabra, Austin, TX (US); Jostine Fei Ho, Austin, TX (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,639

(22) Filed: Aug. 19, 2022

(65) Prior Publication Data

US 2022/0391726 A1 Dec. 8, 2022

Related U.S. Application Data

(63) Continuation of application No. 16/814,291, filed on Mar. 10, 2020, now Pat. No. 11,461,677.

(51) Int. Cl.
| | | |
|---|---|---|
| H04L 9/40 | (2022.01) | |
| G06F 16/23 | (2019.01) | |
| G06F 21/34 | (2013.01) | |
| G06F 21/45 | (2013.01) | |
| G06N 5/04 | (2023.01) | |
| G06N 20/00 | (2019.01) | |

(52) U.S. Cl.
CPC ........... *G06N 5/04* (2013.01); *G06F 16/2379* (2019.01); *G06F 21/34* (2013.01); *G06F 21/45* (2013.01); *G06N 20/00* (2019.01); *H04L 63/0815* (2013.01)

(58) Field of Classification Search
CPC ....... G06F 21/30; G06F 21/45; H04L 63/0815
See application file for complete search history.

(56) References Cited

U.S. PATENT DOCUMENTS

| | | |
|---|---|---|
| 9,225,730 B1 | 12/2015 | Brezinski |
| 9,723,025 B2 | 8/2017 | Kasturirangan |
| 9,836,183 B1 | 12/2017 | Love |

(Continued)

FOREIGN PATENT DOCUMENTS

| | | |
|---|---|---|
| JP | 2011-154532 A | 8/2011 |
| JP | 2015-522859 A | 8/2015 |
| JP | 2018-092600 A | 6/2018 |

OTHER PUBLICATIONS

Office Action for U.S. Appl. No. 17/501,330, dated Jan. 6, 2023, 10 pgs.

(Continued)

*Primary Examiner* — Thaddeus J Plecha
(74) *Attorney, Agent, or Firm* — Sprinkle IP Law Group

(57) ABSTRACT

Systems and methods for embodiments of artificial intelligence systems for identity management are disclosed. Embodiments of the identity management systems disclosed herein may support the correlation of identities from authoritative source systems and accounts from non-authoritative source systems using artificial intelligence techniques.

21 Claims, 5 Drawing Sheets

(56) References Cited

U.S. PATENT DOCUMENTS

| | | | |
|---|---|---|---|
| 10,942,991 B1 | 3/2021 | Kidd | |
| 11,108,828 B1 | 8/2021 | Curtis | |
| 11,461,677 B2 * | 10/2022 | Badawy | G06F 21/577 |
| 11,516,219 B2 | 11/2022 | Badawy | |
| 11,516,259 B2 | 11/2022 | Badawy | |
| 11,533,314 B2 | 12/2022 | Badawy | |
| 11,636,213 B1 | 4/2023 | Elgressy | |
| 11,695,828 B2 | 7/2023 | Badawy | |
| 11,710,078 B2 | 7/2023 | Badawy | |
| 11,809,581 B2 | 11/2023 | Badawy | |
| 11,811,833 B2 | 11/2023 | Badawy | |
| 11,818,136 B2 | 11/2023 | Badawy | |
| 11,888,602 B2 | 1/2024 | Badawy | |
| 11,902,335 B2 | 2/2024 | Badawy | |
| 2012/0324547 A1 | 12/2012 | Vidal | |
| 2015/0200966 A1 | 7/2015 | Kasturirangan | |
| 2016/0063037 A1 | 3/2016 | Savkli | |
| 2017/0195415 A1 * | 7/2017 | Versteeg | H04L 67/306 |
| 2017/0329957 A1 | 11/2017 | Vepa | |
| 2018/0069897 A1 | 3/2018 | Morris | |
| 2018/0075104 A1 * | 3/2018 | Oberbreckling | G06F 16/254 |
| 2019/0260733 A1 * | 8/2019 | Koranda | H04L 67/146 |
| 2020/0050966 A1 * | 2/2020 | Enuka | G06Q 10/10 |
| 2021/0342785 A1 | 11/2021 | Mann | |
| 2021/0349988 A1 | 11/2021 | Lobban | |
| 2021/0374831 A1 | 12/2021 | Hudson | |
| 2022/0269990 A1 | 8/2022 | Badawy | |
| 2022/0300586 A1 | 9/2022 | Domsch | |
| 2022/0360587 A1 | 11/2022 | Badawy | |
| 2023/0017722 A1 | 1/2023 | Badawy | |
| 2023/0035335 A1 | 2/2023 | Badawy | |
| 2023/0051814 A1 | 2/2023 | Badawy | |
| 2023/0135157 A1 | 5/2023 | Badawy | |
| 2023/0325723 A1 | 10/2023 | Badawy | |
| 2024/0073216 | 2/2024 | Badawy | |

OTHER PUBLICATIONS

Notice of Allowance for U.S. Appl. No. 17/391,371, dated Jan. 11, 2023, 6 pgs.
Notice of Allowance for U.S. Appl. No. 17/669,554, dated Jan. 17, 2023, 8 pgs.
Office Action for U.S. Appl. No. 17/501,324, dated Feb. 2, 2023, 15 pgs.
Gibson, Helen and Vickers, Paul, graphTPP: A multivariate based method for interactive graph layout and analysis, 2017, 23 pgs.
Notice of Allowance for U.S. Appl. No. 17/039,594 dated Sep. 23, 2022, 9 pages.
Notice of Allowance for U.S. Appl. No. 17/669,554, dated May 18, 2023, 6 pgs.
Notice of Allowance for U.S. Appl. No. 17/961,939, dated Jun. 7, 2023, 8 pgs.
Notice of Allowance for U.S. Appl. No. 17/501,330, dated Jun. 27, 2023, 5 pgs.
Notice of Allowance for U.S. Appl. No. 17/543,566, dated Jul. 19, 2023, 5 pgs.
Notice of Allowance for U.S. Appl. No. 17/543,566, dated Mar. 27, 2023, 5 pgs.
Notice of Allowance for U.S. Appl. No. 17/391,371, dated Apr. 12, 2023, 2 pgs.
Notice of Allowance for U.S. Appl. No. 17/501,324, dated Apr. 12, 2023, 3 pgs.
Office Action for U.S. Appl. No. 17/985,206, dated May 10, 2023, 11 pgs.
Notice of Allowance for U.S. Appl. No. 17/669,554, dated May 18, 2023, 9 pgs.
Notice of Allowance for U.S. Appl. No. 17/391,371, dated Aug. 9, 2023, 5 pgs.
Office Action for Japanese Patent Application No. 2021-530292, with English translation, dated Jul. 26, 2023, 6 pgs.
Notice of Allowance for U.S. Appl. No. 17/985,206, dated Sep. 7, 2023, 6 pgs.
Notice of Allowance for U.S. Appl. No. 17/391,371, dated Sep. 20, 2023, 2 pgs.
Notice of Allowance for U.S. Appl. No. 17/543,566, dated Sep. 20, 2023, 5 pgs.
Notice of Allowance for U.S. Appl. No. 17/961,939, dated Oct. 18, 2023, 7 pgs.
Notice of Allowance for U.S. Appl. No. 17/825,545, filed Dec. 18, 2023, 9 pgs.
Office Action for U.S. Appl. No. 17/698,178, filed Nov. 30, 2023, 8 pgs.
Notice of Allowance for U.S. Appl. No. 18/334,183, filed Mar. 6, 2024, 7 pgs.

* cited by examiner

|  | created | displayName | email | employeeNumber |
|---|---|---|---|---|
| created | 0.0 | 0.000000 | 0.000000 | 0.0 |
| id | 0.0 | 0.000000 | 0.000000 | 0.0 |
| identityId | 0.0 | 0.000000 | 0.000000 | 0.0 |
| name | 0.0 | 0.000454 | 0.062301 | 0.0 |
| nativeIdentity | 0.0 | 0.000000 | 0.000000 | 0.0 |
| sourceId | 0.0 | 0.000000 | 0.000000 | 0.0 |
| active | 0.0 | 0.000000 | 0.000000 | 0.0 |
| displayName | 0.0 | 0.177948 | 0.000000 | 0.0 |
| emails | 0.0 | 0.00000 | 0.000000 | 0.0 |
| familyName | 0.0 | 0.002012 | 0.000065 | 0.0 |
| formattedName | 0.0 | 0.177948 | 0.000000 | 0.0 |
| givenName | 0.0 | 0.000065 | 0.000065 | 0.0 |
| id.1 | 0.0 | 0.000000 | 0.000000 | 0.0 |
| idNowDescription | 0.0 | 0.000000 | 0.000000 | 0.0 |
| preferredLanguage | 0.0 | 0.000000 | 0.000000 | 0.0 |
| userName | 0.0 | 0.000454 | 0.062301 | 0.0 |
| groups | 0.0 | 0.000000 | 0.000000 | 0.0 |
| isFederatedUser | 0.0 | 0.000000 | 0.000000 | 0.0 |
| IIQDisabled | 0.0 | 0.000000 | 0.000000 | 0.0 |
| userType | 0.0 | 0.000000 | 0.000000 | 0.0 |

ACCOUNT COLUMNS 302

IDENTITY COLUMNS 302

| entitlementCount | firstName | id | IdentityProfile | lastName | manager | name | org |
|---|---|---|---|---|---|---|---|
| 0.000000 | 0.000000 | 0.000000 | 0.0 | 0.000000 | 0.0 | 0.000000 | 0.0 |
| 0.000000 | 0.000000 | 0.000000 | 0.0 | 0.000000 | 0.0 | 0.000000 | 0.0 |
| 0.000000 | 0.000000 | 0.962879 | 0.0 | 0.000000 | 0.0 | 0.000000 | 0.0 |
| 0.000000 | 0.000130 | 0.000000 | 0.0 | 0.000195 | 0.0 | 0.063145 | 0.0 |
| 0.000000 | 0.000000 | 0.000000 | 0.0 | 0.000000 | 0.0 | 0.000000 | 0.0 |
| 0.000000 | 0.000000 | 0.000000 | 0.0 | 0.000000 | 0.0 | 0.000000 | 0.0 |
| 0.000065 | 0.000000 | 0.000000 | 0.0 | 0.000000 | 0.0 | 0.000000 | 0.0 |
| 0.000000 | 0.000000 | 0.000000 | 0.0 | 0.000000 | 0.0 | 0.004867 | 0.0 |
| 0.000000 | 0.000000 | 0.000000 | 0.0 | 0.000000 | 0.0 | 0.000000 | 0.0 |
| 0.000000 | 0.019664 | 0.000000 | 0.0 | 0.649880 | 0.0 | 0.001947 | 0.0 |
| 0.000000 | 0.000000 | 0.000000 | 0.0 | 0.000000 | 0.0 | 0.004867 | 0.0 |
| 0.000000 | 0.206113 | 0.000000 | 0.0 | 0.019988 | 0.0 | 0.000000 | 0.0 |
| 0.000000 | 0.000000 | 0.000000 | 0.0 | 0.000000 | 0.0 | 0.000000 | 0.0 |
| 0.000000 | 0.000000 | 0.000000 | 0.0 | 0.000000 | 0.0 | 0.000000 | 0.0 |
| 0.000000 | 0.000000 | 0.000000 | 0.0 | 0.000000 | 0.0 | 0.000000 | 0.0 |
| 0.000000 | 0.000130 | 0.000000 | 0.0 | 0.000195 | 0.0 | 0.063145 | 0.0 |
| 0.000000 | 0.000000 | 0.000000 | 0.0 | 0.000000 | 0.0 | 0.000000 | 0.0 |
| 0.000065 | 0.000000 | 0.000000 | 0.0 | 0.000000 | 0.0 | 0.000000 | 0.0 |
| 0.000065 | 0.000000 | 0.000000 | 0.0 | 0.000000 | 0.0 | 0.000000 | 0.0 |
| 0.000000 | 0.000000 | 0.000000 | 0.0 | 0.000000 | 0.0 | 0.000000 | 0.0 |

FROM FIG. 3A

FIG. 3B

FEATURE PAIRS 404

| | dist_name_email | dist_name_name | dist_name_legacyemail | dist_name_provisioningId | dist_name_uid | dist_name_ademail | dist_name_ebsnacoaccount |
|---|---|---|---|---|---|---|---|
| 0 | 0.857711 | 0.000000 | 0.857711 | 0.828829 | 0.722870 | 0.857711 | 0.470971 |
| 1 | 0.371864 | 0.000000 | 0.371864 | 0.456349 | 0.388889 | 0.371864 | 1.000000 |
| 2 | 0.385965 | 0.000000 | 0.385965 | 0.442105 | 0.403509 | 0.385965 | 1.000000 |
| 3 | 0.743913 | 0.756733 | 0.743913 | 0.784314 | 0.756733 | 0.798319 | 0.784314 |
| 4 | 0.828283 | 0.000000 | 0.828283 | 0.808081 | 0.629149 | 0.828283 | 0.502886 |

ACCOUNT-IDENTITY PAIR IDENTIFIER 402

| dist_userName_name | dist_userName_legacyemail | dist_userName_provisioningId | dist_userName_uid | dist_userName_ademail | dist_userName_ebsnacoaccount | label |
|---|---|---|---|---|---|---|
| 0 | 0.857711 | 0.828829 | 0.72287 | 0.857711 | 0.470971 | 1 |
| 0 | 0.371864 | 0.456349 | 0.388889 | 0.371864 | 1 | 1 |
| 0 | 0.385965 | 0.442105 | 0.403509 | 0.385965 | 1 | 1 |
| 0.756733 | 0.743913 | 0.784314 | 0.756733 | 0.798319 | 0.784314 | 1 |
| 0 | 0.828283 | 0.808081 | 0.629149 | 0.828283 | 0.502886 | 1 |
| 0 | 0.811063 | 0.802083 | 0.608756 | 0.811063 | 0.513622 | 1 |

402 ACCOUNT-IDENTITY PAIR IDENTIFIER

FIG. 4

SYSTEMS AND METHODS FOR DATA CORRELATION AND ARTIFACT MATCHING IN IDENTITY MANAGEMENT ARTIFICIAL INTELLIGENCE SYSTEMS

RELATED APPLICATIONS

This application is a continuation of, and claims a benefit of priority under 35 U.S.C. 120 of, U.S. patent application Ser. No. 16/814,291 filed Mar. 10, 2020, entitled "SYSTEMS AND METHODS FOR DATA CORRELATION AND ARTIFACT MATCHING IN IDENTITY MANAGEMENT ARTIFICIAL INTELLIGENCE SYSTEMS," issued as U.S. Pat. No. 11,461,677 which is hereby incorporated herein for all purposes.

COPYRIGHT NOTICE

A portion of the disclosure of this patent document contains material to which a claim for copyright is made. The copyright owner has no objection to the facsimile reproduction by anyone of the patent document or the patent disclosure as it appears in the Patent and Trademark Office file or records but reserves all other copyright rights whatsoever.

TECHNICAL FIELD

This disclosure relates generally to computer security, including identity management in a distributed and networked computing environment. In particular, this disclosure relates to enhancing computer security in a distributed networked computing environment through the use of improved data correlation and entity matching in these artificial intelligence identity management systems. Even more specifically, this disclosure relates to the application of machine learning for artificial intelligence identity management systems to apply data correlation and artifact matching to data from source systems.

BACKGROUND

Acts of fraud, data tampering, privacy breaches, theft of intellectual property, and exposure of trade secrets have become front page news in today's business world. The security access risk posed by insiders—persons who are granted access to information assets—is growing in magnitude, with the power to damage brand reputation, lower profits, and erode market capitalization.

Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises of organizations, including for example, provisioning, certifications, access reviews, and Separation of Duties (SOD) processes. Typical identity and access information available from IM solutions may utilize simple context to inform certain decision making processes, however additional, more complex and specific, context may be desirable from a variety of perspectives, including managers, owners, IT or security/regulatory departments, or others. Without such complex contextual data information management systems may suffer from low workflow efficiency and lower security.

However, even such proactive oversight may do little to ease the burden of compliance with regulatory requirements or the assessment of access requests for users in the enterprise environment. These burdens may be a microcosm of a larger issue with typical identity management systems. Namely, the sheer volume of such identity management data combined with the current manner in which identity management systems store and access such data prevents these types of identity management systems from effectively dealing with the volume of such data, which, in turn, prevents this identity management data from being effectively evaluated or even understood.

One particular facet of these problems pertains to the ingestion of data from source systems within an organization. It is axiomatic that to manage, aggregate, or visualize users and their accesses along with other pertinent IM data, it is first necessary to determine what the identity management artifacts pertinent to the organization are. Given the volume of data within an enterprise that may be obtained to determine IM data on identities, entitlements, roles, groups, or other identity management artifacts, and the typically large number of source systems from which the data may be obtained, correlating or processing this data to make canonical determinations about identities or other artifacts and more generally, associate such data pertaining to like artifacts may be extremely difficult.

What is desired therefore, are effective and quick systems and methods for correlating or matching data about identity management artifacts, including identities.

SUMMARY

As mentioned, the sheer volume of identity management data in identity management systems combined with the current manner in which identity management systems store and access such data prevents these types of identity management systems from effectively dealing with the volume of such data, which, in turn, prevents this identity management data from being effectively evaluated or even understood.

Specifically, in most cases, identity management systems obtain data on identity management artifacts from various touchpoint (or source) systems within an enterprise environment. The obtained data is then processed to determine identity management artifacts (or updates to identity management artifacts) to be stored and maintained at the identity management system to facility identity governance with respect to the enterprise. This process is sometimes referred to as data ingestion or the data ingestion stage.

This data ingestion stage therefore usually determines and associates identity management artifacts (e.g., identities, entitlements, etc.) in a manner that facilitates identity governance of those artifact. This ingestion stage is, however, quite complex. There is usually a large amount of data that is collected from different source systems that pertains to the same identity management artifact. For example, with respect to identities, during a data ingestion stage, tens, or hundreds, of thousands (or more) accounts may be harvested from different source systems across an enterprise. Some of these accounts may pertain to the same user, or more generally to the same identity. Thus, to establish an identity at the identity management system, where that identity may be a canonical identity management artifact for that identity it may be desired to correlate or match (used interchangeably herein) the various accounts from across source systems to determine which accounts should be associated with the same identity.

To facilitate this correlation, the source systems may be designated as, or determined to be, authoritative source systems and non-authoritative systems. Accounts from these authoritative source systems are designated to contain direct, identity-specific information that makes it possible to establish a comprehensive list of the identities within the enterprise. The challenging problem then is to accurately correlate the other, non-authoritative accounts, with the corresponding identities. Typically, the correlation stage requires substantial amount of resources and can take months to finalize, prolonging deployment and delaying any benefits of employing identity management systems.

To associate accounts, typically what is done is to rely on human observations to identify commonalities between account and identity data. These observations are then translated into multiple regular expression search queries to generate hard-coded rules scripts that process data from the source system and establish the desired correlations. In many cases, these searches must be performed across every pair of accounts determined from the source systems, resulting in process that may be of polynomial or even exponential order. Moreover, these processes may be repetitive and may not function as designed, as the data retrieved from these source systems may not always conform to a particular schema, or may be sparse in certain instances. These processes ire thus mundane and slow, may take several months to finish, and consume quite a bit of valuable resources.

It would thus be desirable to provide identity management systems and methods for their operation that can accurately correlate account data from different source systems in a performant and scalable manner.

To those ends, among others, embodiments as disclosed herein provide systems and methods for identity management system which correlate accounts from source systems with one another using performant and scalable Machine-Learning (ML) approach. In particular, embodiments may include three stages: data collection and preprocessing; ML model training, and inference (also referred to as prediction), whereby the trained ML model is applied against account data obtained from the source system (e.g., and optionally the ML model retrained). Specifically, embodiments may correlate authoritative accounts for identities (e.g., referred to as identities or identity accounts) from an authoritative source system, with non-authoritative accounts (e.g., referred to herein as just accounts) from a non-authoritative source system.

In the data collection and preprocessing stage, data may be obtained from source systems (e.g., authoritative and non-authoritative). This data can be cleansed (e.g., data exploded into separate columns, bad, duplicative or less recent data removed) and divided into data sets, where an identity data set comprises account data on identities from an authoritative source system (e.g., as the source system is designated as, or determined to be, an authoritative source system such that the identity management system is adapted to utilize each of these accounts as an identity). An account data set comprises account data on accounts from a non-authoritative source system.

A ML model (e.g., a ML classifier) may be trained based on a training data sample that has some correlation across the data from the authoritative source system and the non-authoritative source system. This training data sample may be a training data set that was established in a supervised or an unsupervised manner and may include a correlation between identities as represented by an account from an identity data set from the authoritative source system and an account from the account data set comprises account data on accounts from a non-authoritative source system. This training data sample can be used to train a ML model to perform matching between accounts from that source system and identities (e.g., accounts from that authoritative source system). The trained models will then be able to infer the correct correlations on the larger account data set obtained from that non-authoritative source system (e.g., in the same harvesting or collection, or subsequently at later points in time).

It will be apparent that data sources may have different schemas or other manners of organizing or structuring data stored therein (collectively referred to herein as schema without loss of generality). One method for determining features for the ML model to be trained may be to take all possible pairs of columns from the schema of the non-authoritative data source (e.g., the schema of the accounts) and the schema of the authoritative data source, where each pair of columns will serve as a feature of the model. In most cases, it is not feasible to match all columns from the schema for the account data set (e.g., the number of which may be referred to as M) to all columns for the identity data set (e.g., the number of which may be referred to as N). Moreover, columns in the account data set and the identity data set may include repetitive data in different columns (e.g., a schema may have a "lastName", "lastname", "lname", "surname", etc. columns which may all include substantially similar data). Furthermore, data within certain columns (e.g., in individual accounts) may be null (e.g., especially in cases where that it may be repeated or duplicated elsewhere in the same schema).

In some embodiments, efficiencies may be gained by determining specific features to be utilized for the ML model to be generated for a combination of an authoritative source and a non-authoritative source. Specifically, correlation may be performed on the account data set or identity data set to reduce the amount of brute-force comparisons between the identity's (e.g., M-column) dataset and the (e.g., N-column) accounts data set. In particular, to determine the features that will be used to train a ML model, the (e.g. M) columns of the schema of the non-authoritative data source (e.g., the schema of the accounts) may be evaluated against the (e.g., N) columns of the schema of the authoritative data source (e.g., the schema for the identities) to determine correlated columns (e.g., pairs of columns with one column from the schema of the account and the other column from the schema of the identities). These pairs of correlated columns (referred to as feature pairs) may then be used as a feature for the ML model. Accordingly, each feature pair may include a column associated with the non-authoritative data source and a column associated with the authoritative data source.

To determine correlated columns, a similarity measure may be determined between each of all (or a subset of) possible pairs of columns from the schema of the non-authoritative data source (e.g., the schema of the accounts) and the schema of the authoritative data source. This column similarity measure between columns can be determined using the values of each of the columns across all (or a subset of) accounts from the respective data source. Thus, for a potential pair of columns (one from the schema of the authoritative data source and one from the schema of the non-authoritative data source) the values from that column for all identity accounts from the authoritative data source can be compared with the all the values from the other column from all the identity accounts of the non-authoritative data source to generate a column similarity measure (e.g., based on a union or intersection of the values for each column, a vector comparison, or some other similarity measure (e.g. Jaccard similarity). Only pairs of columns with a column similarity metric above a certain threshold may be chosen as feature pairs. Alternatively, each column from the non-authoritative data source may be paired with a corresponding column of the authoritative data source with which it has the highest similarity measure to generate a set of feature pairs to utilize. To further improve performance of this column correlation, such column similarity measures may be parallelized such that similarity measures for different pairs of columns are determined in parallel using for example a distributed computing tool such as Python's Dask or Apache's Spark.

Once the feature pairs are determined, feature values for these feature pairs may be determined between pairs of accounts from the non-authoritative source and identity accounts from the authoritative data source. In one embodiment, these feature values may be determined for each account-identity pair, or a subset of the account-identity pairs. For a particular account-identity pair, a feature value for a feature pair may be determined by taking the value associated with the account of the account-identity pair for the column of the feature pair associated the non-authoritative source and the value associated with the identity of the account-identity pair for the column of the feature pair associated with the authoritative source, and determining a similarity measure based on the two values. This similarity measure may be, for example, a Jaro similarity metric or a distance measure (e.g., Levenshtein distance).

A training set of account-identity pairs (e.g., their corresponding feature values for each of the feature pairs) can then be used to train the ML model to perform matching between accounts from that source system and identities (e.g., accounts from that authoritative source system). The ML model can be trained as a classifier to determine a label such as a confidence value or a probability that the account and identity are a match (e.g., a value of 1) or no match (e.g., a label of 0). The ML model may be, for example, a Random Forest or an XGBoost model, among others, and may be trained in a supervised, unsupervised or semi-supervised manner. The training set of account-identity pairs may thus be determined (e.g., by manual correlation) and provided as matching account-identity pairs in the training set (e.g., positive examples). A training set may also be determined by utilizing regular expression matching on the values for one or more feature pairs to find a set of account-identity pairs that are correlated. A certain number of the highest matching (e.g., the top 50 matching account-identity pairs, all account-identity pairs over a certain matching threshold, etc.) may be selected as positive examples for the training set. To provide example account-identity pairs that are not correlated (e.g., negative examples), random pairs of accounts and identities may be chosen and provided as training data (e.g., a randomly selected account paired with a randomly selected identity).

In some other embodiments, the values for the feature pairs for each account-identity pair may be used to select a training set of matched account-identity pairs. For example, the set of feature values for each feature pair for an account-identity pair may be summed (or another type of function applied) to generate a pair weight for the account-identity pair. A certain number of account-identity pairs may be selected as positive examples for the training set based on the pair weights (e.g., the 50 account-identity pairs with the highest pair weights, all account-identity pairs having a pair weight over a certain matching threshold, etc.). As another embodiment, the account-identity pairs may be clustered using the generated pair weights or a subset of the feature values for each the account-identity pairs. Positive and negative training sets of account-identity pairs can then be derived from the resulting clusters.

Once the ML model is trained using the training set the ML model may be applied to the remainder of the account-identity pairs based on the feature values generated for those account-identity pairs. The application of the ML model to these account-identity pairs may thus generate a label associated with each account-identity pair indicating a confidence value (or probability) that the account is a match for that identity. Based on that label the account may be associated with that identity or that association or label otherwise stored (e.g., if the label is over some association threshold). Moreover, strong predictions (e.g., account-identity pairs with a predictive label over some threshold) may be added back to the training set (e.g., of positive examples) and the ML model retrained.

To further improve the performance of the application of the ML model to the matching of accounts and identities, preprocessing (e.g., filtering) may be performed to reduce the number of account-identity pairs that are to be predicted. This preprocessing may include, for example, a filter that evaluates the individual combinations of accounts and identities to determine which pairs of accounts and identities (e.g., their feature values) should be submitted to the ML model to determine a predictive label. In one embodiment, this filter may evaluate the feature values for a set of screening feature pairs for each account-identity pair before the ML model is applied to the (e.g., feature values of) that account-identity pair. If the feature values, or one or more of the feature values, for those screening feature pairs is above some threshold the account identity pair may be submitted to the ML model for generation of a predictive label for the account-identity pair. Otherwise, the account-identity pair may not be scored using the ML model. The set of screening feature pairs may be determined, for example, when correlating the columns of the account data source and the identity data source, such that the screening feature pairs may, for example, be some top number (e.g., 5) of feature pairs whose respective columns exhibited the highest similarity values when columns were correlated to determine feature pairs.

Embodiments thus provide numerous advantages over previously available systems and methods for associating account data. First and foremost, embodiment may be offer significant improvement in speed over brute force methods of associating such data, taking on the order of seconds or minutes as compared to the weeks or months taken by other systems and methods. Moreover, the coverage and accuracy of the associations between accounts and identities may be significantly improved. Furthermore, embodiments as disclosed may offer the technological improvement of reducing the computational burden and memory requirements of systems implementing these embodiments. Accordingly, embodiments may improve the performance and responsiveness of identity management systems that utilize embodiments of this type of account correlations by reducing the computation time and processor cycles required to implement such correlations and offering such correlations for use by identity management systems more rapidly. Another advantage is a possible workaround for typos in data.

In one particular embodiment, an identity management system, can obtain identity management data associated with a plurality of source systems in a distributed enterprise computing environment. This identity management data can include data on a set of identity management artifacts utilized in identity management in the distributed enterprise computing environment, wherein the plurality of source systems include a non-authoritative source system and an authoritative source system and the identity management data comprises account data on accounts from the non-authoritative source system and identity data on identities from the authoritative source system.

Embodiments of the identity management system can determine a first set of columns associated with a schema of the non-authoritative data source and a second set of columns associated with a schema of the authoritative data source and form a set of feature pairs specific to the non-authoritative data source and the authoritative data source wherein each feature pair of the set of feature pairs comprises a first column from the first set of columns associated with the schema of the non-authoritative data source and a second column from the second set of columns associated with the schema of the authoritative data source by correlating the first set columns with the second set of columns to determine the set of feature pairs.

Feature values can be generated for each of the feature pairs for each of a set of account-identity pairs, where each account-identity pair comprises a first account of the accounts of the account data from the non-authoritative source system and a first identity of the identities of the identity data from the authoritative data source; the feature value for a feature pair is based on a first value for the first column of the feature pair associated with the first account and a second value for the second column of the feature pair associated with the first identity. A training set of account-identity pairs and associated feature values is obtained and a machine learning model specific to the non-authoritative data source and the authoritative data source trained based on the training set.

The machine learning model is used to generate predictions for one or more account-identity pairs, wherein a prediction for an account-identity pair is based on the feature values associated with that identity pair. If a prediction is over a threshold the account of the account-identify pair is associated with the identity of the account-identify pair.

In some embodiments, correlating the first set of columns with the second set of columns to determine the set of feature pairs comprises determining a similarity value between each of the first set of columns and each of the second set of columns based on the first values for the first column across all the accounts of the account data and second values for the second column across all identities of the identity data, and selecting the feature pairs based on the similarity values.

In a particular embodiment, the set of account-identity pairs can be filtered to select the one or more account-identity pairs for which predictions are to be determined. This filtering may be based on the feature values for a set of screening feature pairs for each of the set of account-identity pairs. The set of screening feature pairs may, in turn, be a top number of feature pairs whose first column and second column have highest similarity values.

In specific embodiments, an interpretation of the prediction for an account-identity pair may be determined by determining a top set of features pairs that resulted in the prediction based on the ML model. Determining the top set of feature pairs may comprise querying the ML model to build a local model for the account-identity pair using the ML model and determining the top set of feature pairs from the local model.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 3A and 3B are a depiction of an example data.

FIG. 4 is a depiction of an example data.

DETAILED DESCRIPTION

Figure 1:
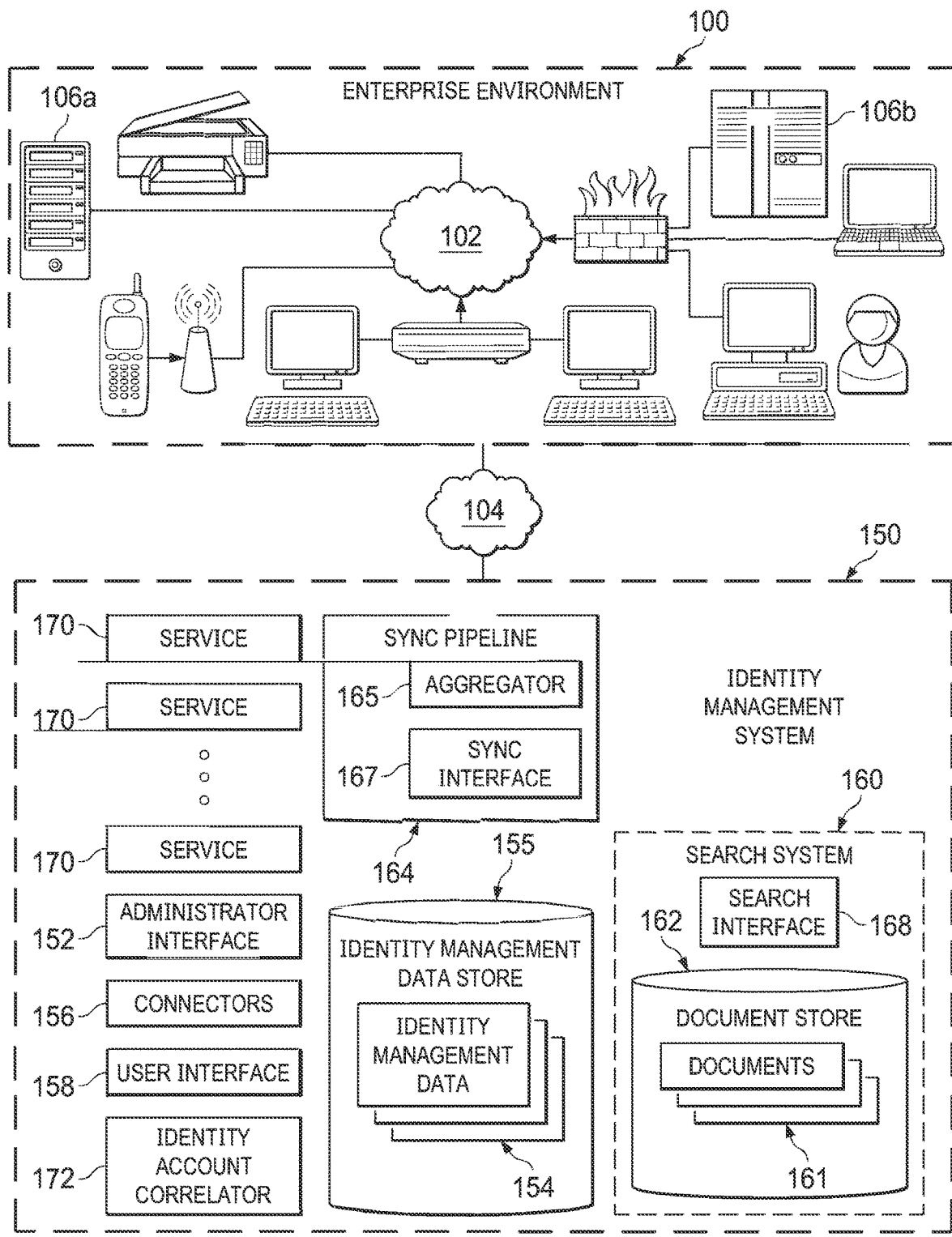
FIG. 1 is a block diagram of a distributed networked computer environment including one embodiment of an identity management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of particular identity management artifacts (including but not limited to, an identity, entitlement, application, account, role, event, policy, group, permission, user, owner, source, configuration, organization, violation, governance group, access profile or account activity) such that these artifacts may be associated and managed accordingly. For example, an identity may be almost physical or virtual thing, place, person or other item that an enterprise would like to define. Identities can therefore be, for example, certain capacities (e.g., manager, engineer, team leader, etc.), titles (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual thing, place, person or other item.

To continue with these example of how these identity governance artifacts may be used, each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc. To facilitate the assignment of these entitlements, enterprises may also be provided with the ability to define roles or other identity management artifacts within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the identity management artifacts using an identity management system, identity governance may be facilitated. For example, by managing the artifacts (e.g., identity or identities, roles, entitlements, etc.) to which users within the enterprise computing environment are assigned, the entitlements or roles to which a user may be assigned (e.g., the functions or access which a user may be allowed) may be controlled. Furthermore, by defining other identity management artifacts, such as more granular access permissions, identity management events or activity may also be determined and evaluated to assess security risk or compliance with identity management policies or rules.

Turning then to FIG. 1, then, a distributed networked computer environment including one embodiment of such an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; gain access to another user's entitlements or for other reasons. Access risks can also arise from roles in enterprise environment 100 which may shift, change, evolve, etc. leaving entitlements non optimally distributed among various users.

To assist in managing the artifacts (e.g., identity, entitlement, roles, etc.) assigned to various users and more generally in managing and assessing access risks in enterprise environment 100, an identity management system 150 may be employed. Such an identity management system 150 may allow an administrative or other type of user to define one or more identity management artifacts such as an identity, entitlement, role, event, access profile or account activity, and associate these defined identity management artifacts using, for example, an administrator interface 152. For example, defined identities may be associated with entitlements or roles. The assignment may occur, for example, by directly assigning an entitlement to an identity, or by assigning a role to an identity whereby the collection of entitlements comprising the role are thus associated with the identity. Examples of such identity management systems are Sailpoint's IdentityIQ and IdentityNow products. Note here, that while the identity management system 150 has been depicted in the diagram as separate and distinct from the enterprise environment 100 and coupled to enterprise environment 100 over a computer network 104 (which may the same as, or different than, network 102), it will be realized that such an identity management system 150 may be deployed as part of the enterprise environment 100, remotely from the enterprise environment, as a cloud based application or set of services, or in another configuration.

It may be helpful to illustrate some examples of identity management artifacts and their usage.

As one example, an identity may thus be almost physical or virtual thing, place, person or other item that an enterprise would like to define. Thus, an identity may be an individual or group of users or humans, employees, a virtual entity like a sensor or a robot, an account and may include capacity, title, groups, processes, physical locations, or almost any other physical or virtual thing, place, person or other item. In one embodiment, an Identity may be an authoritative account that includes a first name, a last name and an email address. As another example, an entitlement may be the ability to perform or access a function within the distributed networked enterprise computer environment 100, including, for example, accessing computing systems, applications, file systems, physical locations, particular data or data items, networks, subnetworks or network locations, etc. Entitlements may also define the actions a user can take with respect to that access. Each of these identities may therefore be assigned zero or more entitlements with respect to the distributed networked computer environments.

Another example of an identity management artifact may be a role. Roles may be used to facilitate the assignment of these entitlements. Thus, enterprises may also be provided with the ability to define roles through the identity management system 150. A role within the context of the identity management system 150 may be a collection of entitlements, or access profiles, that may span different source systems. These roles may be assigned a name or identifiers (e.g., manager, engineer, team leader) by an enterprise that designate the type of user or identity that should be assigned such a role. By assigning a role to an identity or group of identities using the identity management system 150, the identity may be assigned the corresponding collection of entitlements or access items associated with the assigned role. Similarly, enterprises may also be provided with the ability to define access profiles. An access profile may be a set of entitlements that represent a level of logical access (e.g., user, guest, administrator, etc.) to a source or applications.

Connectors 156 of the identity management system 150 may thus request or otherwise obtain data from various touchpoint (or source) systems within enterprise environment 100 to obtain identity management data 154. These source systems may include, for example Active Directory systems, Java Database Connectors within the enterprise 100, Microsoft SQL servers, Azure Active Directory servers, Open LDAP servers, Oracle Databases, SalesForce applications, ServiceNow applications, SAP applications or Google GSuite.

The identity management system 150 can store identity management data 154 in an identity management data store 155. This identify management data store 155 may be, for example, a relational data store, including SQL based data stores such as a MySQL database or the like. The identity management data 154 stored may include a set of entries, each entry corresponding to an identity management artifact as discussed. For example, the identity management data 154 may include entries on an identity (e.g., alphanumerical identifiers for identities) as defined and managed by the identity management system, a list or vector of entitlements, roles or access profiles assigned to that identity by the identity management system or other types of artifacts. A time stamp at which the identity management data was collected (e.g., from a source system) may be associated with the data for a particular artifact. Other data could also be associated with each artifact, including data that may be provided from other systems such as a title, location or department associated with the identity. In one embodiment, the identity management data 154 for an artifact (e.g., identity) can be stored in a cube (e.g., "Identity Cube") where all identity management data 154 associated with a particular artifact (e.g., for an identity all of their accounts from all data sources, and all attributes and entitlements of those accounts) may be associated.

As another example, the identity management data 154 may also include entries corresponding to entitlements and roles, where each entry for a role may include the role identifier (e.g., alphanumerical identifier or name for the role) and a list or vector of the entitlements associated with each role. Other data could also be associated with each role, such as a title, location or department associated with the role. Moreover, the identity management data 154 may also include event data collected from various systems within the enterprise environment 100 that is associated with the identities defined in the identity management data 154 through the evaluation or analysis of these events or other data in an identity management context. A user may interact with the identity management system 150 through a user interface 158 to access or manipulate data on identities, roles, entitlements, events or generally perform identity management with respect to enterprise environment 100.

As part of a robust identity management system, it is thus desirable to effectively search the identity management data 154 associated with an enterprise 100. Specifically, it is desired to provide an identity management system with effective ways to store, index and search such identity management data to increase the efficacy of search of identity management data at least by speeding the searching of such identity management data and improving the results of this searching. Identity management system 150 may thus include search system 160 having an identity management document store 162 (also referred to herein as a search index). This identity management document store (or just document store) 162 may, in one embodiment, be a NoSQL data store designed to index, store, access, retrieve and search documents 161 such as, for example, Elasticsearch, MongoDB, Azure Cosmos or the like. The document store 162 may thus include an interface (e.g., a REpresentational State Transfer (REST) API or the like) whereby requests for the indexing, access or searching of documents 161 may be sent through the interface. This interface may receive queries in a native syntax specific to the data store 162 and return results to those queries.

Search system 160 may store data included in, or derived from, identity management data 154 in the document store 162 using such an interface. Specifically, in certain embodiments, the search system 160 may be in communication with a sync pipeline 164. The sync pipeline 164 may access the identity management data 154 and evaluate the identity management data 154 of the relational data store to transform the identity management data 154 stored therein into documents according to a denormalized document model for identity management artifacts. The sync pipeline 164 can then generate messages for indexing and storing these documents in the document store 162 and send the indexing messages to the search service 160 either atomically or in bulk. These indexing messages may instruct a document store 162 to store documents for identity management artifacts or to nest one or more identity management artifacts in an associated identity management artifact.

In one embodiment, sync pipeline 164 may include an aggregator 165. The aggregator 165 may at some time interval, receive updates from, or query, the identity management data store 154 to identify which artifacts have been created, updated, and deleted. The aggregator 165 can also query the identity management data 154 to determine data associated with those artifacts.

Additionally, the sync pipeline 164 may include a sync interface 167 through which indexing messages (e.g., events) may be received from various services 170 employed by the identity management system 150 (e.g., when those services have data they wish to be indexed in documents 161 in document store 162). Based on the artifacts the sync pipeline can assemble a sync message (e.g., an indexing message) for one or more artifacts (e.g., a message for creating, updating or deleting a document 161 corresponding to that artifact in the document store 162). In one embodiment, the aggregator 165 may serve to buffer, merge or orchestrate determined data, received indexing messages or the sending of sync messages such that requests (e.g., sync or indexing messages) to the other components (e.g., the document store 162) of the identity management system may be efficiently dispatched while still maintaining substantially real-time updates to the documents 161 in the document store 162.

These indexing messages can be received by the document store 162 and used to index the data for documents 161 for the identity management artifacts in the data store 162. In particular, the document store 162 may be configured according to a mapping definition which tells the document store 162 how to index the fields stored in the documents 161 stored therein. An example of such a mapping definition is provided in the Appendix. The documents 161 in the data store may thus represent the identity management artifacts of the enterprise 100 according to a nested denormalized document model. There may thus be a document for each artifact (e.g., identity, entitlement, role, event, access profile, account activity, etc.) associated with the enterprise environment 100. In certain embodiments, these documents formed according to the data model may be nested documents whereby a document for an identity management artifact (e.g., such as an identity, role, event, etc.) may include, as a nested or child document, documents for related identity management artifacts, even in instances where documents for those related identity management artifacts may be separately stored and indexed in the document data store 162 (e.g., as top level, root, or parent documents). In other words, in certain embodiments the documents 161 are formed according to a data model by which certain document 161 for related artifacts may be nested inside those related documents 161, even in cases where those documents 161 are themselves stored independently in the data store 162 (e.g., as separate documents 161). This configuration may allow more efficient storage and searching of related documents or objects in the data store 162. For example, an Identity document may have zero or more nested accesses, accounts, groups or application documents related to that Identity document, even in instances where those accesses, groups, accounts or applications are themselves maintained as separate documents 161 in the data store 162.

As an example of identity management data that may be obtained from an identity management system, the following is one example of a JavaScript Object Notation (JSON) object that may relate to an identity:

```
{
  "attributes": {
    "Department": "Finance",
    "costcenter": "[R01e, L03]",
    "displayName": "Catherine Simmons",
    "email": "Catherine.Simmons@demoexample.com",
    "empId": "1b2c3d",
    "firstname": "Catherine",
    "inactive": "false",
    "jobtitle": "Treasury Analyst",
    "lastname": "Simmons",
    "location": "London",
    "manager": "Amanda.Ross",
    "region": "Europe",
```

```
    "riskScore": 528,
    "startDate": "12/31/2016 00:00:00AM UTC",
    "nativeIdentity_source_2": "source_2",
    "awesome_attribute_source_1": "source_1",
    "twin_attribute_a": "twin a",
    "twin_attribute_b": "twin b",
    "twin_attribute_c": "twin c"
 },
 "id": "2c9084ee5a8de328015a8de370100082",
 "integration_id": "iiq",
 "customer_id": "ida-bali",
 "meta": {
   "created": "2017-03-02T07:19:37.233Z",
   "modified": "2017-03-02T07:24:12.024Z"
 },
 "name": "Catherine.Simmons",
 "refs": {
   "accounts": {
     "id": [
       "2c9084ee5a8de328015a8de370110083"
     ],
     "type": "account"
   },
   "tags": [
       {
         "id": "2c9084ee5a8ad545345345a8de370110083"
         "name": "SOD-SOX",
         "type": "TAG"
       },
       {
         "id": "2c9084ee5a8ad545345345a8de370122093"
         "name": "PrivilegedAccess",
         "type": "TAG"
       },
    ]
    "entitlements": {
      "id": [
        "2c9084ee5a8de328015a8de449060e54",
        "2c9084ee5a8de328015a8de449060e55"
      ],
      "type": "entitlement"
    },
    "manager": {
      "id": [
        "2c9084ee5a8de022015a8de0c52b031d"
      ],
      "type": "identity"
    }
  },
  "type": "identity"
}
```

As another example of identity management data that may be obtained from an identity management system, the following is one example of a JSON object that may relate to an entitlement:

```
{
 "integration_id": "bd992e37-bbe7-45ae-bbbf-c97a59194cbc",
 "refs": {
   "application": {
     "id": [
       "2c948083616ca13a01616ca1d4aa0301"
     ],
     "type": "application"
   }
 },
 "tags": [
     {
       "id": "2c9084ee5a8ad545345345a8de370110083"
       "name": "SOD-SOX",
       "type": "TAG"
     },
     {
       "id": "2c9084ee5a8ad545345345a8de370122093"
       "name": "PrivilegedAccess",
```

```
    "type": "TAG"
   },
 ]
 "meta": {
  "created": "2018-02-06T19:40:08.005Z",
  "modified": "2018-02-06T19:40:08.018Z"
 },
 "name": "Domain Administrators",
 "attributes": {
  "description": "Domain Administrators group on Active Directory",
  "attribute": "memberOf",
  "aggregated": true,
  "requestable": true,
  "type": "group",
  "value": "cn=Domain Administrators,dc=domain,dc=local"
 },
 "id": "2c948083616ca13a01616ca1f1c50377",
 "type": "entitlement",
 "customer_id": "3a60b474-4f43-4523-83d1-eb0fd571828f"
}
```

Search system 160 may thus offer an interface 168 through which the documents in the data store 162 may be queried. This interface may allow queries to be submitted where the queries may be formulated according to a search query string syntax that allows the querying of nested documents (or data in nested documents) of the data store 162. The search interface 168 can receive these queries, formulated according to the search query string syntax, and may evaluate the received queries to extract nested search expressions (e.g., expressions of a search query related to nested documents). The documents 161 of the data store 162 can then be searched based on the query, whereby any nested document within the documents 161 identified in the search query may be search according to their specified search terms.

As may be recalled from the above discussion, connectors 156 of the identity management system 150 may thus request or otherwise obtain data from a variety of source systems within enterprise environment 100 to obtain identity management data 154. These source systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite. The volume of data ingested from such source systems may thus be quite large.

It is axiomatic that to manage, aggregate, or visualize users and their accesses along with other pertinent IM data, it is first necessary to determine what the identity management artifacts pertinent to the organization are. Given the volume of data within an enterprise that may be obtained to determine IM data on identities, entitlements, roles, groups, or other identity management artifacts, and the typically large number of source systems from which the data may be obtained, correlating or processing this data to make canonical determinations about identities or other artifacts and more generally, associate such data pertaining to like artifacts may be extremely difficult. Such problems may manifest, for example, during a deployment process of an identity management system 150 with respect to an enterprise environment 100 (e.g., an initial deployment or integration of identity management system 150 with enterprise environment 100) as hundreds or thousands of accounts are harvested by connectors 156 across the source systems of the enterprise environment 100.

Identity management system 150 may thus need a way to effectively deal with volume of such data from the source systems to allow this identity management data to be effectively evaluated and understood. Specifically, in most cases, identity management system 150 obtains data on identity management artifacts from various touchpoint (or source) systems within an enterprise environment 100 through connectors 156. The obtained data is stored in identity management data 154, then processed to determine identity management artifacts (or updates to identity management artifacts) to be stored and maintained at the identity management system 100 in identity management data 154 to facility identity governance with respect to the enterprise. This process is sometimes referred to as data ingestion or the data ingestion stage.

This data ingestion stage therefore usually determines and associates identity management artifacts (e.g., identities, entitlements, etc.) in a manner that facilitates identity governance of those artifact. This ingestion stage is, however, quite complex. There is usually a large amount of data that is collected from different source systems that pertains to the same identity management artifact. For example, with respect to identities, during a data ingestion stage, tens, or hundreds, of thousands (or more) accounts may be harvested from different source systems across an enterprise. Some of these accounts may pertain to the same user, or more generally to the same identity. Thus, to establish an identity at the identity management system, where that identity may be a canonical identity management artifact for that identity it may be desired to correlate or match (used interchangeably herein) the various accounts from across source systems to determine which accounts should be associated with the same identity.

To illustrate in more detail, certain source systems (e.g., source system 106a) may be designated as, or determined to be, an authoritative source system. Accounts from these authoritative source systems may include direct, identity-specific information (E.g., such as a Social Security Number or the like) that makes it possible to establish a comprehensive list of the identities within the enterprise. The data on accounts from these authoritative source systems (e.g., source system 106a) may be harvested by connectors 156 and stored in identity management data 154, where each account from these authoritative source systems may be taken as referring to an identity that may be used for IM purposes. These accounts (e.g., a set of data associated with a distinct account at the authoritative source system) from authoritative source systems (e.g., source system 106a) are thus referred to herein without loss of generality as identity accounts or just identities.

Other source systems (e.g., source system 106b) within the enterprise environment 100 may be non-authoritative source systems (e.g., that do not contain such direct, identity specific information). The data on accounts from these non-authoritative source systems (e.g., source system 106b) may also be harvested by connectors 156 and stored in identity management data 154. To facilitate IM with respect to enterprise environment 100 then, identity management system 150 may need to accurately correlate these other, non-authoritative accounts (e.g., from non-authoritative source system 106b) with the corresponding identities (e.g., accounts from the authoritative source system 106a).

To those ends, among others, embodiments of the identity management system 150 may include an identity account correlator 172 which correlates accounts from source systems 106 with one another using performant and scalable ML approach. In particular, embodiments of an identity account correlator 172 may act on account data obtained from the source systems 106 by preprocessing the account data, training an ML model, and performing inference (also referred to as prediction), whereby the trained ML model is applied against account data obtained from the source systems 106 (e.g., and optionally the ML model retrained). Specifically, embodiments may correlate authoritative accounts for identities obtained from an authoritative source system 106a, with non-authoritative accounts (e.g., referred to herein as just accounts) obtained from a non-authoritative source system 106b and store such correlations or associations in the identity management data 154. These correlations and the account data may be presented to a user (e.g., through user interface 158) such that the user may view or change such associations or, in one embodiment, request an explanation for such associations.

Figure 2:
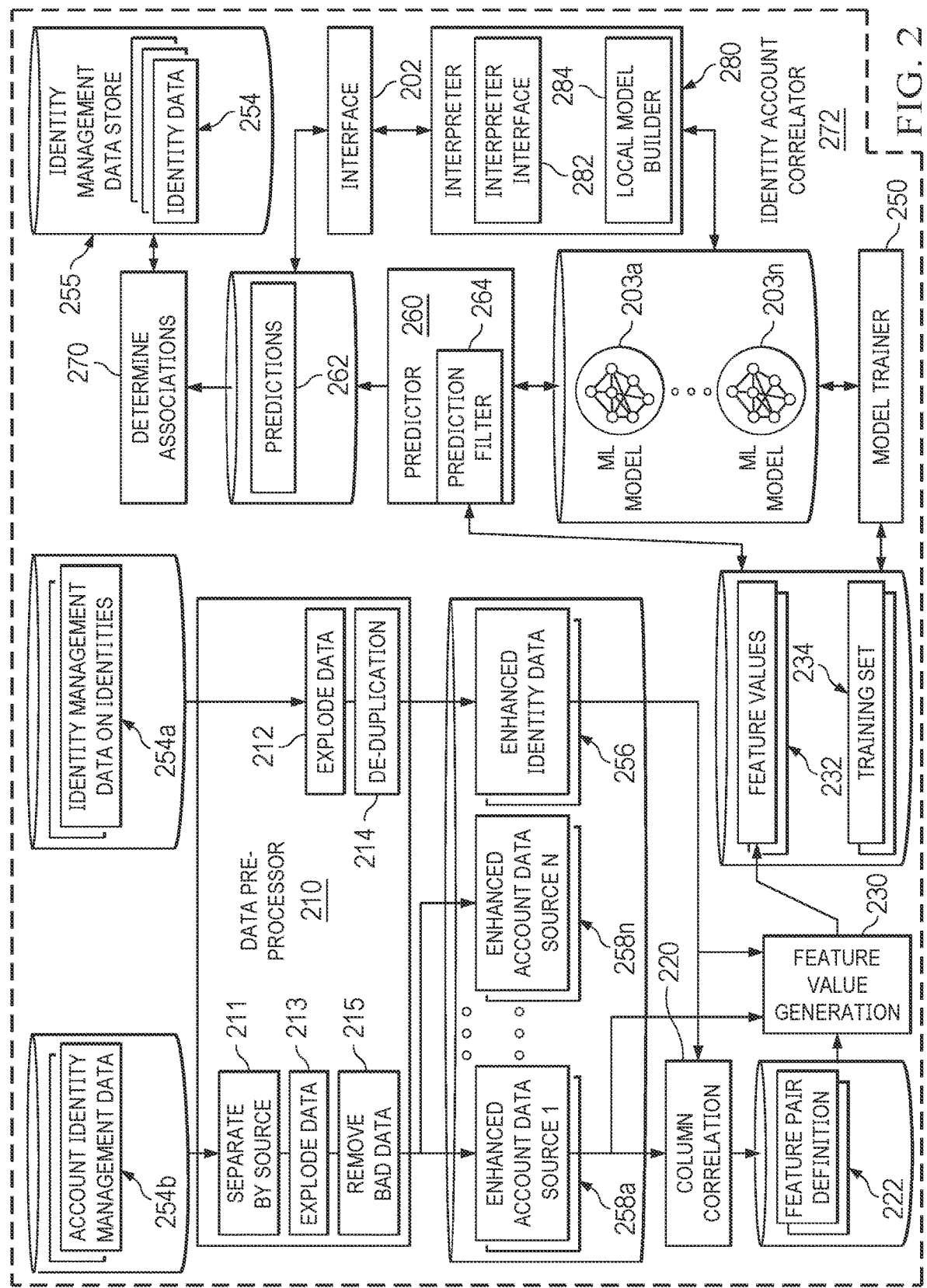
FIG. 2 is a block diagram of an architecture of an identity account correlator.

Turning then to FIG. 2, one embodiment of the architecture and functioning of an identity account correlator is depicted. Here, identity account correlator 272 may access identity management data in identity management data store 255, where that identify magnet data 254 includes identity management data 254b on accounts that was obtained from one or more non-authoritative source systems during data collection from an enterprise environment, and identity management data 254a on identity accounts that was obtained from an authoritative source system during data collection from the enterprise environment. In response to a request to associate the accounts of identity management data 254bon and the identities of identity management data 254a (e.g., as received through interface 202, identity account correlator 272 may provide the identity management data 254a, 254b to data preprocessor 210. It will be understood with reference to such data that the term "column" as used herein will be taken to mean any feature, field, keyword, etc. of a data set that is part of the schema, model, object or other structure (collectively referred to as schema herein without loss of generality) used to organize the data set, without loss of generality. The use of the term column should therefore in no way be taken as a limitation on the type or formats of data sets that may be processed or the manner in which such data sets are stored or otherwise maintained (e.g., embodiments may be applied to data stored or structured as SQL data, NoSQL data or other types of data, etc.).

Data preprocessor 210 may cleanse the identity management data 254a on identities from the authoritative source system by exploding (STEP 212) any data in a column that includes multiple values (e.g., lists or JSON data) into separate columns for each of the values. The data preprocessor 210 may also remove bad, duplicative or less recent data from the identity accounts. Moreover, the data preprocessor may consolidate the identity accounts such that only a most recent identity account is retained for a given identity (STEP 214). The result of this data preprocessing on the identity accounts from the authoritative data source may be an enhanced (or cleansed) identity data set 256 comprising account data on identities from the authoritative source system.

Similarly, data preprocessor 210 may cleanse the identity management data 254b on identities from the non-authoritative source systems by dividing the identity management data 254b into account data sets such that each account data set comprises accounts from a single non-authoritative data source (STEP 211) Each account data set may be exploded (STEP 213) so any data in a column that includes multiple values (e.g., lists or JSON data) can be placed into separate columns for each of the values (STEP 213). The data preprocessor 210 may also remove bad, duplicative or less recent data from the identity accounts (STEP 215). The result of this data preprocessing on the account data from the non-authoritative data sources may be a set of enhanced (or cleansed) account data sets 258a-258n each comprising accounts from a single, non-authoritative source system.

In some embodiments, identity account correlator 272 may build a ML model 203 (e.g., an ML classifier) specific to a non-authoritative data source and an authoritative data source. To build such an ML model 203, a ML model 203 specific to a combination of a non-authoritative data source and an authoritative data source may be trained based on a training data sample that has some correlation across the data from that authoritative source system and that non-authoritative source system. This training data sample may be a training data set that was established in a supervised or an unsupervised manner and may include a correlation between identities as represented by an account from an identity data set from the authoritative source system and an account from the account data set comprising account data on accounts from that non-authoritative source system. This training data sample can be used to train a ML model to perform matching between accounts from that source system and identities (e.g., accounts from that authoritative source system). The trained model 103 will then be able to infer the correct correlations on the larger account data set obtained from that non-authoritative source system (e.g., in the same harvesting or collection, or subsequently at later points in time).

It will be apparent that data sources may have different schemas or other manners of organizing or structuring data stored therein (collectively referred to herein as schema without loss of generality). One method for determining features for the ML model 103 for a non-authoritative data source and an authoritative data source may be to take all possible pairs of columns from the schema of the non-authoritative data source (e.g., the schema of the accounts) and the schema of the authoritative data source, where each pair of columns will serve as a feature of the model. In most cases, it is not feasible to match all columns from the schema for the account data set (e.g., the number of which may be referred to as M) to all columns for the identity data set (e.g., the number of which may be referred to as N). Moreover, columns in the account data set and the identity data set may include repetitive data in different columns (e.g., a schema may have a "lastName", "lastname", "lname", "surname", etc. columns which may all include substantially similar data). Furthermore, data within certain columns (e.g., in individual accounts) may be null (e.g., especially in cases where that it may be repeated or duplicated elsewhere in the same schema).

In some embodiments, efficiencies may be gained by determining specific features to be utilized for the ML model 203 to be generated for a combination of an authoritative source and a non-authoritative source. Specifically, correlation may be performed on the account data set or identity data set to reduce the amount of brute-force comparisons between the identity's (e.g., M-column) dataset and the (e.g., N-column) accounts data set. In particular, to determine the features that will be used to train a ML model 203, the (e.g. M) columns of the schema of the non-authoritative data source (e.g., the schema of the accounts) may be evaluated against the (e.g., N) columns of the schema of the authoritative data source (e.g., the schema for the identities) to determine correlated columns (e.g., pairs of columns with one column from the schema of the account and the other column from the schema of the identities). These pairs of correlated columns (referred to as feature pairs) may then be used as a feature for the ML model 203 to be trained for that combination of authoritative source and non-authoritative source. Accordingly, each feature pair may include a column associated with the non-authoritative data source and a column associated with the authoritative data source.

In one embodiment then, to build such a ML model 203 specific to a combination of a non-authoritative data source and an authoritative data source, the enhanced account data for the non-authoritative data source (e.g., enhance account data 258a) and the enhanced identity data for the authoritative data source (identity data set 256) may be provided to column correlator (STEP 220). Column correlator may determine feature pairs (pairs of correlated columns) to be used as a feature for the ML model 203 for that combination of non-authoritative data source and an authoritative data source. The definition 222 of each feature pair (e.g., a mapping between the column of the schema of the non-authoritative data source of the feature pair and the correlated column of the schema of the authoritative data source for that feature pair) can then be stored.

To determine correlated columns, a similarity measure may be determined between each of all (or a subset of) possible pairs of columns from the schema of the non-authoritative data source (e.g., the schema of the accounts) and the schema of the authoritative data source. This column similarity measure between columns can be determined using the values of each of the columns across all (or a subset of) accounts from the respective data source. Thus, for a potential pair of columns (one from the schema of the authoritative data source and one from the schema of the non-authoritative data source) the values from that column for all identity accounts from the authoritative data source can be compared with the all the values from the other column from all the identity accounts of the non-authoritative data source to generate a column similarity measure (e.g., based on a union or intersection of the values for each column, a vector comparison, or some other similarity measure). Only pairs of columns with a column similarity metric above a certain threshold may be chosen as feature pairs. Alternatively, each column from the non-authoritative data source may be paired with a corresponding column of the authoritative data source with which it has the highest similarity measure to generate a set of feature pairs to utilize. To further improve performance of this column correlation, such column similarity measures may be parallelized such that similarity measures for different pairs of columns are determined in parallel using for example a distributed computing tool such as Python's Dask or Apache's Spark.

To aid in an understanding of embodiments of column correlation to determine feature pairs, attention is directed to FIGS. 3A and 3B. Here, an example data set is depicted in a tabular format where the column names for the columns of a schema of the authoritative data source (e.g., for identity accounts) is depicted in area 302 along the vertical axis of the table while column names for the columns of a schema for the non-authoritative data source (e.g., for accounts) is depicted in area 304 at the top of the table along the horizontal access. The values of the table represent a similarity measure determined based on the values of the associated column in area 302 for all identity accounts from the authoritative data source and the values of the associated column in area 304 from all the identity accounts of the non-authoritative data source. These similarity measures can be utilized to determine feature pairs. For example, for this data set the column "name" from the authoritative data source may be correlated with column "email" from the non-authoritative data source to make a feature pair (e.g., which may be named, for example, "dist_name_email") based on the high similarity value determine between the columns. As another example, the column "username" from the authoritative data source may be correlated with column "name" from the non-authoritative data source to make a feature pair (e.g., which may be named, for example, "dist_username_name") based on the high similarity value determine between the columns.

Returning to FIG. 2, once the feature pairs are determined for that combination of non-authoritative data source and authoritative data source, and the definitions of the feature pairs 222 stored, feature values for the defined feature pairs 222 may be determined between pairs of accounts from the non-authoritative source and identity accounts from the authoritative data source. To determine feature values for the defined feature pairs 222 specific to the combination of the non-authoritative data source and the authoritative data source, the enhanced account data for the non-authoritative data source (e.g., enhanced account data 258a) and the enhanced identity data for the authoritative data source (identity data set 256) may be provided to feature value generator 230.

In one embodiment, a feature value generator may determine feature values 232 for each account-identity pair (e.g. for each possible pair of an account from enhanced account data 258a and an identity from identity data set 256), or a subset of the account-identity pairs (STEP 230). For a particular account-identity pair, a feature value for a specific feature pair may be determined by taking the value associated with the account of the account-identity pair for the column of the feature pair associated with the non-authoritative source and the value associated with the identity of the account-identity pair for the column of the feature pair associated with the authoritative source, and determining a similarity measure based on the two values. This similarity measure may be, for example, a Jaro similarity metric or a distance measure (e.g., Levenshtein distance).

To aid in an understanding of embodiments of feature value generation for feature pairs with respect to account-identify pairs, attention is directed to FIG. 4. It is useful with reference to FIG. 4 to recall the above discussion on the example data of FIGS. 3A and 3B pertaining to the determination of feature pairs. In the example of FIGS. 3A and 3B, the column "name" from the authoritative data source was correlated with column "email" from the non-authoritative data source to make a feature pair (e.g., which may be named, for example, "dist_name_email") based on the high similarity value determine between the columns. As another example in FIGS. 3A and 3B, the column "username" from the authoritative data source may be correlated with column "name" from the non-authoritative data source to make a feature pair (e.g., which may be named, for example, "dist_username_name") based on the high similarity value determine between the columns.

In FIG. 4, an example data set is depicted in a tabular format where determined feature pair names are depicted in area 404 along the horizontal axis of the table while identifiers for account-identity pairs are depicted in area 402 at the left side of the table along the vertical access (e.g., each identifier refers to a pair comprising an account included in an account from enhanced account data and an identity from the identity data set). The values of the table represent a similarity measure for the associated feature pair named in area 404 determined based on the value from the account of the account-identify pair identified in area 404 for the feature of the feature pair associated with the schema of accounts from the non-authoritative data source and the value from the identity of the account-identify pair identified in area 404 for the feature of the feature pair associated with the schema of identities from the authoritative data source. So, for example, cell 406 represents a similarity value derived from values from an account-identity pair identified as pair "2" for a feature pair named "dist_name_email". Specifically, one value used to determine the similarity value of cell 406 may come from the value in the "name" column for the identity comprising account-identity pair "2" while the other value used to determine the similarity value of cell 406 may come from the value in the "email" column for the account comprising account-identity pair "2".

Looking again at FIG. 2, a training set 234 of account-identity pairs (e.g., their corresponding feature values for each of the feature pairs) can then be determined by a model trainer (STEP 250) and used to train a ML model 203 (e.g., ML model 203*a*) specific to the non-authoritative source system and the authoritative source system to perform matching between accounts from that source system and identity accounts from that authoritative source system. The ML model 203 can be trained as a classifier to determine a label such as a confidence value or a probability that the account and identity are a match (e.g., a value of 1) or no match (e.g., a label of 0). The ML model 203 may be, for example, a Random Forest, an XGBoost model, a Deep Learning model or a logistic regression model, among others, and may be trained in a supervised, unsupervised or semi-supervised manner.

The training set 234 of account-identity pairs may thus be determined (e.g., by manual correlation) and provided as matching account-identity pairs in the training set 234 (e.g., positive examples). A training set 234 may also be determined by utilizing regular expression matching on the values for one or more feature pairs to find a set of account-identity pairs that are correlated. A certain number of the highest matching (e.g., the top 50 matching account-identity pairs, all account-identity pairs over a certain matching threshold, etc.) may be selected as positive examples for the training set 234. To provide example account-identity pairs that are not correlated (e.g., negative examples), random pairs of accounts and identities may be chosen and provided as part of the training set 234 (e.g., a randomly selected account paired with a randomly selected identity).

In some other embodiments, the feature values 232 for the feature pairs for each account-identity pair may be used to select a training set 234 of matched account-identity pairs. For example, the set of feature values 232 for each feature pair for an account-identity pair may be summed (or another type of function applied) to generate a pair weight for the account-identity pair. A certain number of account-identity pairs may be selected as positive examples for the training set 234 based on the pair weights (e.g., the 50 account-identity pairs with the highest pair weights, all account-identity pairs having a pair weight over a certain matching threshold, etc.). As another embodiment, the account-identity pairs may be clustered using the generated pair weights or a subset of the feature values for each the account-identity pairs. Positive and negative training sets 234 of account-identity pairs can then be derived from the resulting clusters.

Thus, once a ML model 203 is trained using the training set of 234 of account-identity pairs (e.g., feature values 232 for those account-identity pairs) the model 203 may be stored and applied to classify or label account and identity pairs from that particular non-authoritative data source and authoritative data source. There may be a ML model 203 trained for each combination of non-authoritative data source and authoritative source system. For example, in one embodiment, there may be a ML model 203*a* trained for a combination of the non-authoritative source system from which account data 258*a* was obtained and the authoritative source system from which identity data 256 was obtained, a ML model 203*n* trained for a combination of the non-authoritative source system from which account data 258*n* was obtained and the authoritative source system from which identity data 256 was obtained, etc.

The ML model 203 for a particular combination of non-authoritative source system and authoritative source system, may then be applied by predictor (STEP 260) to account-identity pairs (e.g., those not included in the training set or account-identity pairs newly created when new data is harvested from either the non-authoritative source system or authoritative source system) from those systems based on the feature values 232 generated for those account-identity pairs. The application of the ML model 203 to these account-identity pairs may thus generate labels (also referred to as predictions) 262 associated with each account-identity pair indicating a confidence value (or probability) that the account of the account-identity pair is a match for the identity of the account-identity pair. Based on these predictions 262, the account may be associated with that identity or that association or label otherwise stored (e.g., if the label is over some association threshold) (STEP 270). In one embodiment, the label associated with an account-identity pair can be used to make an association or non-association decision based on a comparison of the label associated with the account-identity pair with an association threshold (which may itself be determined during training of the model 203). Based on whether the probability is above or below (or equal) to the association threshold, the account and identity may be associated. Moreover, strong predictions (e.g., account-identity pairs with a predictive label over some threshold) may be added back to the training set 234 (e.g., of positive examples) and the ML model retrained by model trainer 250. In addition, it will be understood that ML model 203 may be retrained at any point, including the reception of new data from the authoritative source system or non-authoritative source system associated with the ML model 203 in a continuous active learning (CAL) approach.

To further improve the performance of the application of the ML model 203 to the matching of accounts and identities, preprocessing (e.g., filtering) may be performed to reduce the account-identity pairs that are to be predicted (STEP 264). This preprocessing may include, for example, a filter that evaluates the individual combinations of accounts and identities to determine which account-identity pairs (e.g., their feature values) should be submitted to the ML model 203 to determine a predictive label. In one embodiment, this filter may evaluate the feature values 232 for a set of screening feature pairs for each account-identity pair before the ML model 203 is applied to the (e.g., feature values of) that account-identity pair. If the feature values 232, or one or more of the feature values 232, for those screening feature pairs is above some threshold the account-identity pair may be submitted to the ML model 203 for generation of a predictive label for the account-identity pair. Otherwise, the account-identity pair may not be scored using the ML model 203. The set of screening feature pairs may be determined, for example, when correlating the columns of the account data source and the identity data source (STEP 220), such that the screening feature pairs may, for example, be some top number (e.g., 5) of feature pairs whose respective columns exhibited the highest similarity values when columns were correlated to determine feature pairs.

Once the associations or labels are determined for account-identity pairs these account-identity pairs and their labels or associations may be presented to a user through the interface 202 or otherwise returned in response to request to determine such associations or labels. In some cases, then, as a user may be presented with associations between accounts and identities and labels regarding the same, it may be desirable to offer the user some degree of insight into the association, such as the features that influenced that determination. Accordingly, in some embodiments, when associations between accounts and identities are returned to the identity management system and to the user through a user interface 202, the user interface 202 may offer an interface to allow a user to obtain additional information on one or more of the provided associations (e.g., referred to as an interpretation). Such an interpretation may be utilized by a user to probe a particular association and be provided with the top or most influential features for that particular association. This capability, in turn, may will help the user to relate to the association issued by the identity account correlator 272 and incite confidence in the identity account correlator's 272 results. Consequently, by providing such an interpretation, a user may gain confidence in the associations provided and the identity management system itself.

In some embodiments, when the user requests such interpretations for one or more associations of accounts and identities, these account-identity pairs may be submitted to the identity account correlator 272 through interface 202 in a request for an interpretation for those account-identity pairs. To determine an interpretation for these account-identity pairs, identity account correlator 272 may include interpreter 280. These account-identity pairs may be passed to interpret 280 through interpreter interface 282. In some embodiments, interpreter 280 may utilize a principle referred to as 'Interpretability of Models' whereby the interpreter 280 may be utilized as an independent process from the ML models 203 training. This interpreter 280 can be queried to provide explanations in terms of how much and what type (positive or negative) of influence did the features have over the ML models 203 labeling decision.

Thus, an account-identity pair for which an interpretation is desired can be submitted to the interpreter 280 by the identity account correlator 272 through the interpreter interface 282. For each of these access requests (e.g., identity and entitlement pair), the local model builder 284 may build a localized model (e.g., a local model) for that account-identity pair by querying the ML model 203 in a "neighborhood" of that account-identity pair to build a local generalized linear model for that account-identity pair. This querying may be accomplished by determining values for the set of features pairs associated with the account-identity pair (e.g., one or more of the same features pairs used to train the classifier) and varying one or more of these values within a tolerance for a plurality of requests to the ML model 203 to determine labels for the set of features values that are close, but not the same as, the values for those features pairs associated with the account-identity pair itself.

In one embodiment, the local builder 284 may be, for example, based on Local Interpretable Model-Agnostic Explanations (LIME). Embodiments of such a localized model may, for example, be a logistic regression model or the like with a set of coefficients for a corresponding set of features. While such an approximation may be valid within a small neighborhood of the account-identity pair, the coefficients of the approximate (e.g., linear) model may be utilized to provide the most influential features. A feature corresponding to a coefficient of the localized model with a large magnitude may indicates a strong influence, while the sign of the coefficient will indicate whether the effect of the corresponding feature was in the or negative. Based on the magnitude or signs of the coefficients associated with each feature of the localized model for the account-identity pair a top number (e.g., top 2, top 5, etc.) of influential features pairs (e.g., positive or negative) may be determined.

The top set of features pairs that resulted in the label for the account-identity pair may then be returned by the interpreter 280 such that the top features can be displayed to the user through the user interface 202. In one embodiments, these features may be displayed along with their absolute or relative magnitude, in for example a histogram or other graphical presentation. Alternatively, an English language explanation associated with one or more of the determined features may be determined and presented in the interface. For example, the interpreter 280 may have an explanation mapping table that associates features or combinations of features with corresponding English language explanations. When the top features are determined, one or more of the top features may be used to determine a corresponding English language explanation from the explanation table and this explanation displayed through the user interface 202.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A system, comprising:
a processor;
a non-transitory, computer-readable storage medium, including computer instructions for:
obtaining identity management data associated with a plurality of source systems in a distributed enterprise computing environment, the identity management data comprising data on a set of identity management artifacts utilized in identity management in the distributed enterprise computing environment, wherein the plurality of source systems include a first source system and a second source system and the identity management data comprises account data on accounts from the first source system and identity data on identities from the second source system;
obtaining a set of feature pairs specific to the first source system and the second source system by correlating features associated with the first source system and the second source system;
generating feature values for each of the feature pairs for each of a set of account-identity pairs, where each account-identity pair comprises a first account of the accounts of the account data from the first source system and a first identity of the identities of the identity data from the second source system, and generating a feature value for a feature pair is based on a first value for the feature pair associated with the first account and a second value for the feature pair associated with the first identity;
obtaining a training set of account-identity pairs and associated feature values;
training a machine learning (ML) model associated with the first source system and the second source system based on the training set; and
generating predictions for one or more account-identity pairs using the ML model, wherein a prediction for an account-identity pair is based on feature values associated with that account-identity pair and if the prediction is over a threshold the account of the account-identity pair is associated with the identity of the account-identity pair.

2. The system of claim 1, wherein each feature pair is associated with a first column associated with a schema of the first data source and a second column associated with a schema of the second data source.

3. The system of claim 1, wherein a first column associated with the first data source and a second column associated with the second data source for each feature pair is determined by correlating the first column associated with the first data source with the second column associated with the second data source.

4. The system of claim 3, wherein the correlation is based on a similarity between values of the first column and values of the second column.

5. The system of claim 4, wherein the similarity is based on a Jaro similarity metric or a distance measure.

6. The system of claim 1, wherein the prediction is generated by the ML model.

7. The system of claim 1, wherein the first data source is a non-authoritative data source and the second data source is an authoritative data source.

8. A method, comprising:
obtaining identity management data associated with a plurality of source systems in a distributed enterprise computing environment, the identity management data comprising data on a set of identity management artifacts utilized in identity management in the distributed enterprise computing environment, wherein the plurality of source systems include a first source system and a second source system and the identity management data comprises account data on accounts from the first source system and identity data on identities from the second source system;
obtaining a set of feature pairs specific to the first source system and the second source system by correlating features associated with the first source system and the second source system;
generating feature values for each of the feature pairs for each of a set of account-identity pairs, where each account-identity pair comprises a first account of the accounts of the account data from the first source system and a first identity of the identities of the identity data from the second source system, and generating a feature value for a feature pair is based on a first value for the feature pair associated with the first account and a second value for the feature pair associated with the first identity;
obtaining a training set of account-identity pairs and associated feature values;
training a machine learning (ML) model associated with the first source system and the second source system based on the training set; and
generating predictions for one or more account-identity pairs using the ML model, wherein a prediction for an account-identity pair is based on feature values associated with that account-identity pair and if the prediction is over a threshold the account of the account-identity pair is associated with the identity of the account-identity pair.

9. The method of claim 8, wherein each feature pair is associated with a first column associated with a schema of the first data source and a second column associated with a schema of the second data source.

10. The method of claim 8, wherein a first column associated with the first data source and a second column associated with the second data source for each feature pair is determined by correlating the first column associated with the first data source with the second column associated with the second data source.

11. The method of claim 10, wherein the correlation is based on a similarity between values of the first column and values of the second column.

12. The method of claim 11, wherein the similarity is based on a Jaro similarity metric or a distance measure.

13. The method of claim 8, wherein the prediction is generated by the ML model.

14. The method of claim 8, wherein the first data source is a non-authoritative data source and the second data source is an authoritative data source.

15. A non-transitory computer readable medium, comprising instructions for:
obtaining identity management data associated with a plurality of source systems in a distributed enterprise computing environment, the identity management data comprising data on a set of identity management artifacts utilized in identity management in the distributed enterprise computing environment, wherein the plurality of source systems include a first source system and a second source system and the identity management data comprises account data on accounts from the first source system and identity data on identities from the second source system;

obtaining a set of feature pairs specific to the first source system and the second source system by correlating features associated with the first source system and the second source system;

generating feature values for each of the feature pairs for each of a set of account-identity pairs, where each account-identity pair comprises a first account of the accounts of the account data from the first source system and a first identity of the identities of the identity data from the second source system, and generating a feature value for a feature pair is based on a first value for the feature pair associated with the first account and a second value for the feature pair associated with the first identity;

obtaining a training set of account-identity pairs and associated feature values;

training a machine learning (ML) model associated with the first source system and the second source system based on the training set; and generating predictions for one or more account-identity pairs using the ML model, wherein a prediction for an account-identity pair is based on feature values associated with that account-identity pair and if the prediction is over a threshold the account of the account-identity pair is associated with the identity of the account-identity pair.

16. The non-transitory computer readable medium of claim 15, wherein each feature pair is associated with a first column associated with a schema of the first data source and a second column associated with a schema of the second data source.

17. The non-transitory computer readable medium of claim 15, wherein a first column associated with the first data source and a second column associated with the second data source for each feature pair is determined by correlating the first column associated with the first data source with the second column associated with the second data source.

18. The non-transitory computer readable medium of claim 17, wherein the correlation is based on a similarity between values of the first column and values of the second column.

19. The non-transitory computer readable medium of claim 18, wherein the similarity is based on a Jaro similarity metric or a distance measure.

20. The non-transitory computer readable medium of claim 15, wherein the prediction is generated by the ML model.

21. The non-transitory computer readable medium of claim 15, wherein the first data source is a non-authoritative data source and the second data source is an authoritative data source.

* * * * *